United States Patent Office 3,142,548
Patented July 28, 1964

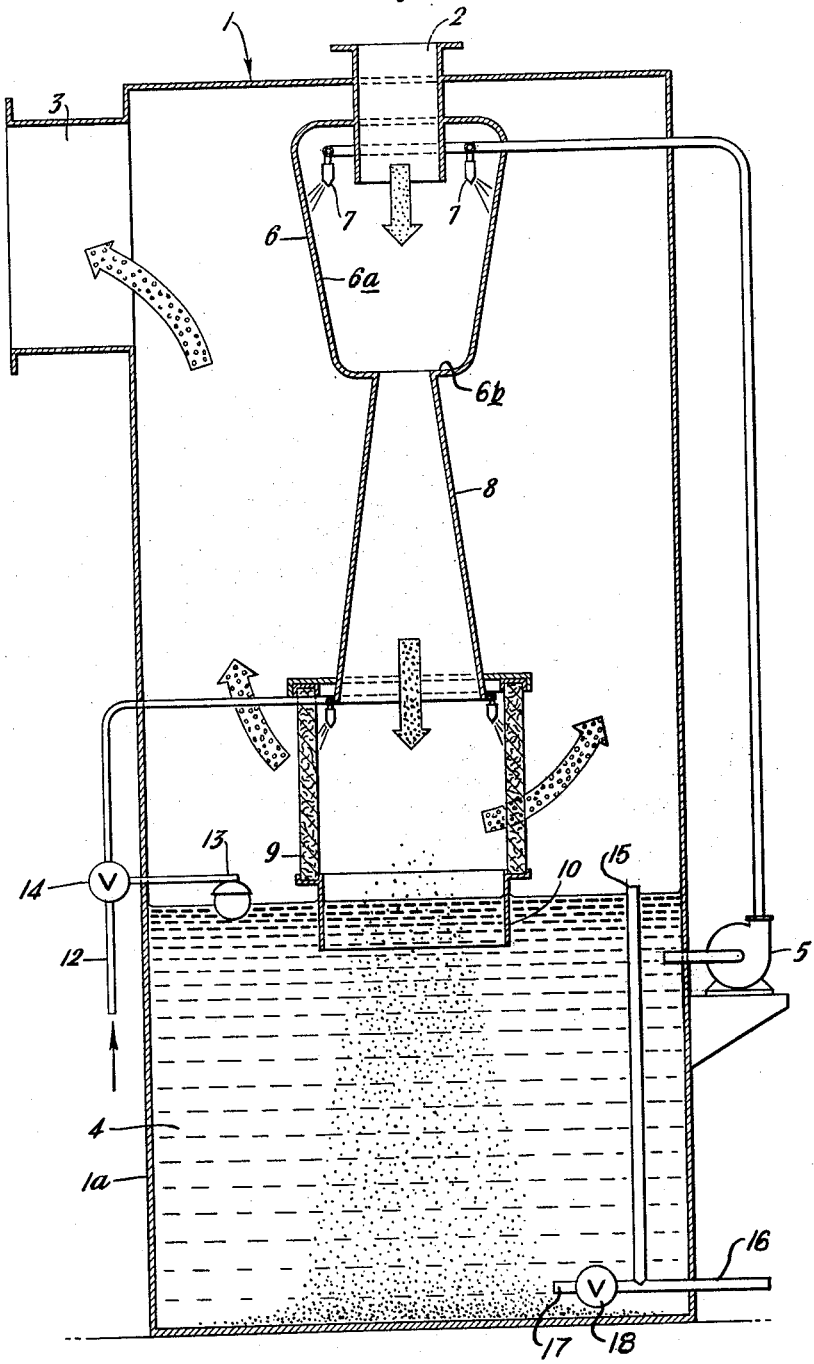

3,142,548
WET-CLEANING OF GASES
Evert Krantz, Stockholm, Sweden, assignor to Aktiebolaget Svenska Flaktfabriken, Stockholm, Sweden
Filed Apr. 4, 1961, Ser. No. 100,628
4 Claims. (Cl. 55—89)

The present invention relates to an improvement in wet-cleaning gases by agglomeration between dust particles and an atomized liquid supplied to the gas during its passage towards a liquid basin. The gas is then separated from the dust and liquid particles by a filter-mat which surrounds the bottom portion of the gas passage, the main part of the gas passing through the mat, while the entrained liquid, now separated, flows down into the basin and thereafter by re-circulation is supplied again to the cleaning procedure to repeat the cycle.

In wet filters of the above-mentioned kind the liquid being supplied for the agglomeration also acts as a washing liquid by splashing the filter mat. However, this quantity of liquid has been discovered to be insufficient for an effective cleaning of the filter mat, especially the upper portion of the mat, although the portions of the mat located downwardly of the upper portion will be exposed to a progressively increased quantity of liquid because of the downward direction of the supplied liquid.

The invention has for its primary object the elimination of the above-mentioned shortcoming, by providing an effective cleaning of the filter-mat by intermittently spreading against the inner surface of the upper part of the filter-mat, in an oblique direction, an additional quantity of liquid. The quantity of liquid supplied corresponds to the quantity of replacement liquid which is necessary for maintaining the quantity of liquid circulating in the cleaning process constant. In certain instances, depending on the amount of foreign matter entrained in the gas flow, it may be necessary to add a quantity of chemically active solvent to the liquid being supplied intermittently for the purpose of dissolving deposits in the filter mat. Because the additional liquid is supplied to the filter mat in the above described manner, it has proved sufficient to limit this quantity of liquid to correspond to the relatively small quantity required for replacement which is the amount necessary for maintaining a constant quantity of liquid circulating in the cleaning cycle. The limited quantity of liquid added makes it possible to add small quantities of chemically active solvent instead of the great quantities of solvents which would have to be added to treat the total quantity of liquid.

The invention will now be described more in detail with reference to the accompanying drawing illustrating a cross-section through an embodiment of a device suitable for carrying out the invention.

Referring now to the drawing, a casing 1 of a wet-cleaning device is provided with an inlet 2 for the entering gas which is to be cleaned and an outlet 3 for the outgoing clean gas. The lower part of the casing 1 is a reservoir 1a for used washing liquid 4. The washing liquid 4 is circulated by means of a pump 5 and is supplied to the incoming raw gas in a liquid supply chamber 6 equipped with a primary liquid washing means, in the present embodiment comprising a plurality of nozzles 7 about the inner periphery of the liquid supply chamber. The nozzles spray atomized liquid against the side walls 6a of the chamber. The chamber 6 is of conical shape and is at its lower end joined with a diffuser 8. The liquid running down the walls 6a of the chamber is introduced peripherally to the flowing gas by shoulder means 6b at the junction of the chamber 6 and the diffuser 8 and is thereby atomized and commingled with the gas. A filter-mat 9 is joined with the diffuser 8 and surrounds the mixture of gas and liquid during its passage down to the reservoir 1a. The main portion of the gas passes through the filter-mat and is discharged through the clean gas outlet 3 while liquid drops and agglomerated dust particles partly continue their passage down to the reservoir or are deposited in the filter-mat. In this case, the gas is caused to flow downwardly toward the reservoir 1a and then substantially horizontally through the filter mat, the heavier particles thereby being separated from the gas flow prior to the passage of the gas through the filter mat 9. The filter mat removes the remaining agglomerated dust particles and a major part of the atomized liquid. A duct collar 10 projects into the liquid and constitutes an extension of the filter mat 9.

In accordance with the present invention, instead of intermittently supplying a quantity of separate liquid directly to the reservoir in order to keep the level of liquid in the reservoir 1a constant, separate liquid supply means comprising a plurality of nozzles, a supply pipe 12 and a level regulator 13 provides means for spreading the liquid in an oblique direction against the inner or upstream surface of the upper portion of the filter-mat.

The supply pipe 12 is provided for supplying the make-up liquid to the nozzles. The adjustment of the quantity of liquid to be supplied by the nozzles can be controlled manually or, as illustrated in the drawing, automatically, by means of a level regulator 13 located in the liquid reservoir 1a and operating a valve 14 or other control means located in the supply pipe 12 so that as the washing liquid level drops, the valve 14 is opened thus allowing entry of a sufficient quantity of liquid to raise the level to where once more the level regulator 13 closes the valve 14 and cuts off the liquid being supplied. The reservoir 1a is provided with an outlet and known means for discharging the separated sludge. For example, as shown in the drawing, an overflow pipe 15 which runs to a drain line 16 is positioned in the reservoir 1a and is connected at the bottom to a sludge-removal outlet 17 through a valve 18 which may be operated, either manually or automatically, at suitable intervals to drain the sludge accumulated in the bottom of the tank.

Thus it is apparent that in accordance with the present invention, the quantity of make-up liquid necessary to maintain the liquid level in the reservoir constant is the amount spread across the inner surface of the upper portion of the filter-mat thereby cleaning the filter-mat.

What I claim is:

1. A method for wet cleaning dust-laden gases in apparatus having a supply chamber opening downwardly to a primary washing liquid reservoir, including the steps of introducing primary washing liquid from said reservoir, peripherally into said chamber transverse to the direction of gas flow to cause atomization of said liquid in said gas and agglomeration of said dust particles with said atomized liquid, causing the gas to flow downwardly toward the reservoir and then substantially horizontally so as to separate heavier particles from the gas flow, separating the remaining agglomerated dust particles and a major part of the atomized liquid from the gas during said horizontal flow by passing said gas through a filter-mat while causing the agglomerated dust particles to accumulate on one side of said filter-mat, collecting a major portion of the atomized primary washing liquid and the agglomerated dust particles in said reservoir, and utilizing the collected liquid as the source of primary washing liquid; the improvement comprising the steps of intermittently introducing a quantity of separate washing liquid obliquely to said one side of the filter-mat in order to clean said filter-mat and collecting said separate liquid in said reservoir, and controlling said quantity in response to changes in the level of said liquid in the reservoir to make-up the portion of said atomized primary washing liquid not separated from the gas flow to thereby maintain constant the quantity of liquid in the reservoir.

2. A method according to claim 1 including the step of providing in said separate quantity of washing liquid a chemically active solvent for dissolving deposits of said agglomerated dust particles on said filter-mat.

3. In an apparatus for wet cleaning gas comprising a gas inlet and upright liquid supply chamber connected to said gas inlet at its upper end and open at its lower end, a primary washing liquid means in said chamber adapted to provide a flow of washing liquid on the walls of said chamber in the direction of flow of said entering gas, and shoulder means to direct said flowing washing liquid peripherally and transversely to the flow of said gas whereby said washing liquid is atomized and commingled with said gas causing agglomeration of dust particles in said gas, a washing liquid reservoir underlying said open lower end of the supply chamber, means to recirculate washing liquid from said reservoir to said primary washing liquid means, a gas outlet spaced above said reservoir and laterally from said open lower end of the supply chamber whereby the gas flows downwardly through said supply chamber, out its open lower end and horizontally above said reservoir toward said outlet, the heavier particles entrained in said gas continuing their downward flow into said reservoir, an annular filter-mat surrounding said open lower end, and disposed transverse to the horizontal flow of gas intermediate said open lower end and said reservoir to provide further separation of said agglomerated dust particles from said gas and of a portion of said washing liquid, said filter-mat having an extension depending into the reservoir to prevent gas bypassing said filter mat and to direct said separated particles and liquid into said reservoir, the remaining portion of said atomized washing liquid passing through said filter-mat and out through said gas outlet, and means for cleaning said filter-mat comprising separate liquid supply means at the upper portion of said filter-mat to direct said separate liquid against said filter-mat to flow downwardly thereover and into said reservoir to thereby clean said mat, said separate liquid supply means having control means operated in response to changes in the level of said reservoir to intermittently supply a quantity of liquid corresponding to the remaining portion of said washing liquid passing through said filter-mat to maintain constant the liquid level in said reservoir.

4. In an apparatus for wet-cleaning gases according to claim 3, wherein said separate liquid supply means comprises a plurality of nozzles, a supply pipe adapted to provide a supply of washing liquid to said plurality of nozzles, and an operator for said control means comprising an automatic regulator responsive to changes in the level of said washing liquid in said reservoir operating said control means to supply said separate liquid to said nozzles when the level in the reservoir is decreased, and to cut off further flow of separate liquid through said nozzles when said liquid reaches a predetermined level in said reservoir.

References Cited in the file of this patent

UNITED STATES PATENTS

| | | |
|---|---|---|
| 1,871,022 | Zellweger | Aug. 9, 1932 |
| 2,513,174 | Hess | June 27, 1950 |
| 2,725,117 | Borgerd | Nov. 29, 1955 |
| 2,994,406 | Hemeon | Aug. 1, 1961 |
| 3,009,687 | Hendricks | Nov. 21, 1961 |

FOREIGN PATENTS

| | | |
|---|---|---|
| 624,542 | France | Apr. 9, 1927 |